US007577701B1

(12) United States Patent
Johns et al.

(10) Patent No.: US 7,577,701 B1
(45) Date of Patent: Aug. 18, 2009

(54) SYSTEM AND METHOD FOR CONTINUOUS MONITORING AND MEASUREMENT OF PERFORMANCE OF COMPUTERS ON NETWORK

(75) Inventors: William M. Johns, Marysville, OH (US); Brian G. Lindau, Middletown, OH (US)

(73) Assignee: InsightETE Corporation, Columbus, OH (US)

( * ) Notice: Subject to any disclaimer, the term of this patent is extended or adjusted under 35 U.S.C. 154(b) by 937 days.

(21) Appl. No.: 09/765,431

(22) Filed: Jan. 22, 2001

(51) Int. Cl.
*G06F 15/16* (2006.01)
(52) U.S. Cl. .............. 709/203; 709/204; 709/206; 709/223; 709/217; 709/220
(58) Field of Classification Search ................ 709/224, 709/206, 203, 204, 223, 217, 220; 790/224
See application file for complete search history.

(56) References Cited

U.S. PATENT DOCUMENTS

| | | | | |
|---|---|---|---|---|
| 5,459,837 A | * | 10/1995 | Caccavale | 709/226 |
| 5,459,857 A | * | 10/1995 | Ludlam et al. | 714/6 |
| 5,687,167 A | * | 11/1997 | Bertin et al. | 370/254 |
| 5,696,895 A | * | 12/1997 | Hemphill et al. | 714/4 |
| 5,761,428 A | | 6/1998 | Sidey | 709/223 |
| 5,764,626 A | * | 6/1998 | VanDervort | 370/232 |
| 5,812,529 A | | 9/1998 | Czarnik et al. | 370/245 |
| 5,812,780 A | * | 9/1998 | Chen et al. | 709/224 |
| 5,850,523 A | * | 12/1998 | Gretta, Jr. | 709/224 |
| 5,964,837 A | * | 10/1999 | Chao et al. | 709/224 |
| 5,991,264 A | | 11/1999 | Croslin | 370/225 |
| 6,003,079 A | | 12/1999 | Friedrich et al. | 709/224 |
| 6,021,437 A | * | 2/2000 | Chen et al. | 709/224 |
| 6,021,439 A | | 2/2000 | Turek et al. | 709/224 |
| 6,038,216 A | | 3/2000 | Packer | 370/231 |
| 6,041,332 A | | 3/2000 | Miller et al. | 707/104.1 |

(Continued)

FOREIGN PATENT DOCUMENTS

EP 0 905 621 3/1999

(Continued)

OTHER PUBLICATIONS

Ferguson et al., *Quality of Service in the Internet: Fact, Fiction, or Compromise?*, May 11, 2000, pp. 1-18.

(Continued)

*Primary Examiner*—Kenny S Lin
*Assistant Examiner*—Lan-Dai T Truong
(74) *Attorney, Agent, or Firm*—Blank Rome LLP (57) ABSTRACT

Performance on a networked system is monitored through five interlocking monitoring techniques. A network monitoring process causes pseudo messages to be sent from various points in the network and monitors the progress of the pseudo messages. A client-server monitoring process monitors server availability and receives logs from various client-server processes and determines the performance of both server and server processes, which can be grouped by end-user location. A mainframe monitoring process monitors the performance of the various hardware and software components on a mainframe. A reporting and administration process compiles reports and makes them remotely available over the Internet. An e-business monitoring process monitors servers accessible to customers over the Internet by use of a Java applet which sends time stamps indicating access. The five processes are tied together through a central data repository, called a data mart.

11 Claims, 6 Drawing Sheets

U.S. PATENT DOCUMENTS

| | | | | |
|---|---|---|---|---|
| 6,070,190 | A | 5/2000 | Reps et al. | 709/224 |
| 6,073,162 | A | 6/2000 | Johannsen et al. | 709/202 |
| 6,079,036 | A * | 6/2000 | Moharram | 714/712 |
| 6,151,688 | A | 11/2000 | Wipfel et al. | 714/48 |
| 6,237,034 | B1 | 5/2001 | Fulford | 709/224 |
| 6,308,208 | B1 | 10/2001 | Jung et al. | 709/224 |
| 6,405,250 | B1 * | 6/2002 | Lin et al. | 709/224 |
| 6,449,739 | B1 | 9/2002 | Landan | 714/47 |
| 6,754,664 | B1 * | 6/2004 | Bush | 707/102 |
| 6,831,890 | B1 * | 12/2004 | Goldsack et al. | 370/229 |
| 6,894,972 | B1 * | 5/2005 | Phaal | 370/229 |
| 6,931,452 | B1 * | 8/2005 | Lamberton et al. | 709/242 |
| 7,058,704 | B1 * | 6/2006 | Mangipudi et al. | 709/223 |
| 2002/0049815 | A1 * | 4/2002 | Dattatri | 709/206 |
| 2002/0055967 | A1 * | 5/2002 | Coussement | 709/202 |
| 2002/0107026 | A1 * | 8/2002 | Agrawal et al. | 455/453 |
| 2002/0120727 | A1 * | 8/2002 | Curley et al. | 709/223 |
| 2002/0133584 | A1 * | 9/2002 | Greuel et al. | 709/224 |
| 2003/0133417 | A1 * | 7/2003 | Badt, Jr. | 370/254 |

FOREIGN PATENT DOCUMENTS

WO  WO 99/63439  12/1999

OTHER PUBLICATIONS

QoS forum.com *Quality of Service FAQ*, May 9, 1999, pp. 1-24.
*End-end Internet performance assessments*, May 11, 2000, pp. 1-7.
PCT International Search Report, May 13, 2002.

* cited by examiner

FIG. 1
NETWORK PROCESS

FIG. 2
CLIENT/SERVER PROCESSES

FIG. 3
MAINFRAME PROCESSES

FIG. 4
REPORTING AND ADMINISTRATION PROCESSES

FIG. 5
e-BUSINESS PROCESSES

FIG. 6

SYSTEM AND METHOD FOR CONTINUOUS MONITORING AND MEASUREMENT OF PERFORMANCE OF COMPUTERS ON NETWORK

FIELD OF THE INVENTION

The present invention is directed to a system and method for continuous monitoring and measurement of the performance of a system and more particularly to such a system and method in which the system performance as a user would observe it is monitored and measured.

In this context a "System" includes combination of computers and telecommunications networks that might include mainframe computers, servers and clients, all interconnected via networks that use a variety of communications protocols.

"System performance" includes the percentage of time that a system is available to the user relative to the time it is intended to be available; it also includes the responsiveness of the system to the user, in terms of the delay between the user entering data into a workstation keyboard and the system responding with new data on the user's workstation screen.

DESCRIPTION OF RELATED ART

In many fields, it is necessary to monitor and measure system performance for mission-critical systems. For example, in e-commerce systems, poor performance can motivate customers to go to competitors.

To that end, performance monitoring is known in the art. However, many existing performance monitors place an additional load on a system by interrupting the processing of transactions with their own monitoring transactions. As a consequence, the performance that is being monitored is degraded.

U.S. Pat. No. 6,003,079 to Friedrich et al teaches the continuous measurement of quality of service in a federated application environment. The measurement method includes measurements of the processing times, the send and receive bandwidth demand, the physical host resource demands, and the response times. The source of a quality-of-service problem can be diagnosed.

U.S. Pat. No. 6,021,439 to Turek et al teaches a method of identifying quality-of-service problems associated with a given Web server. The method depends on the installation of a token on a Web page on the Web server and the capability of a Web client to collect information on the quality of service.

U.S. Pat. No. 6,041,332 to Miller et al teaches product-independent performance monitoring for telecommunications equipment. Performance monitoring software for a specific equipment system is assembled from a library of product-independent data processing modules and product-dependent data.

However, none of those references teaches a solution to the above-noted problems of the prior art.

SUMMARY OF THE INVENTION

It will be readily apparent from the above discussion that a need exists in the art to overcome the above-noted problems of existing monitoring and measuring techniques.

It is therefore an object of the invention to provide true end-to-end measurement which accurately reflects the user's experience with the system, including e-business applications.

It is another object of the invention to use specialized agents capable of filtering the appropriate data from application and system logs.

It is another object of the invention to provide an Auto Discovery feature to simplify product installation efforts.

It is another object of the invention to provide an Auto Maintenance feature to minimize system administration efforts.

It is another object of the invention to automatically populate and maintain Event Correlation rules used for reporting the cause of impairment and its corresponding SLA effect.

It is another object of the invention to use non-intrusive monitoring through the use of data filtering and remote processing.

It is another object of the invention to use a browser interface for reporting and administration.

It is another object of the invention to reuse existing measurement tools through data normalization.

It is another object of the invention to collect and maintain problem history in a central data repository.

It is another object of the invention to manage the filter agents and data collectors centrally.

It is another object of the invention to facilitate automatic system recovery.

It is another object of the invention to facilitate integration into system management environments and problem ticket reporting systems.

It is another object of the invention to facilitate the use of tools and enhancements to include a total system capacity planning tool including network, server, business capacity planning and business process mapping.

It is another object of the invention to track and store, in a centralized data repository, service-level management and business metrics.

It is another object of the invention to support client-side monitoring for critical applications.

To achieve the above and other objects, the invention permits the measurement of system performance across a complex System. The System can comprise multiple mainframe computers, data and application servers, and clients (user workstations), and multiple networks using a variety of communications protocols (including both IBM Mainframe protocols and client/server protocols). The System might also include Web servers connected to the Internet (or an organization's Intranet) and user workstations connected to the System via the Internet. (Throughout the present specification, it will be understood that IBM is a trademark of International Business Machines Corporation of Armonk, N.Y., U.S.A.)

A transaction entered at a workstation can be tracked throughout the system as it passes various nodes in the system. This tracking continues until it reaches the application on a mainframe or server and again as it is returned to the user's workstation. Thus, the total delay can be monitored as perceived by the end-user. In addition, any problems encountered on the transaction's route can also be tracked and subsequently diagnosed.

Many third-party software packages include code that produces transaction logs that are typically used as an audit trail of user activity and resource usage. For those applications that do not log activity, a modification can be made to incorporate such ability. For example, the industry standard code provided by Computer Measurement Group (CMG), Application Response Measurement System (ARMS), is inserted in the application code to produce transaction logs. The invention contains the capability to interact with these logs, extracting the appropriate data to calculate server responsiveness, transaction failures, and resource usage.

The network is monitored by a system including a centralized manager, BDNetManager, and one or more monitoring agents. The monitoring agents are BDNetMon, and BDAvailMon, and BDSNMP. These agents are specialized to focus on performance and availability.

BDNetMon accepts a pair of device addresses, which are to be monitored from BDNetManager. The pair of addresses includes the address of a production server and an address of a user's location. BDNetMon then sends pseudo messages of various sizes routed from the application server to the user location. The message's time is tracked between every segment in the network and the detail is routed back to the agent where it is written to a file.

DBNetAvail accepts suspect network addresses from BDNetManager and monitors the address to determine whether any end-user addresses are severed from accessing any of the monitored systems. If so, BDAvailMon collects appropriate data to store in the Data Mart to accurately calculate downtime, determine affected systems, and collect details such as network addresses and device information.

DBSNMP polls devices for SNMP alerts. If a severe alert is detected it is sent to BDNetManager which passes the address of the alert to BDAvailMon. BDAvailMon determines if the alert indicates a system failure.

Several Agents are used to collect system connectivity information. BDMSSNA and BDTN3270 are agents that collect SNA Gateway information to cross-reference SNA LUNAMES (network addresses understood by IBM systems), with IP address (network address understood by non-IBM systems). This information is used by monitoring agents to tie Server agent information with network information in order to measure transaction responsiveness from the user through the server complex and back to the user.

BDSocket Agent is used to determine when a server complex changes. BDSocket Agent detects when a server complex configuration changes by seeing a change in the connected application socket sessions. For example, if a new application server is added to the complex, the BDSocket will see an additional socket session, and can send a message to an Alert table requesting maintenance to be performed by the Administrator.

The agents understand the systems they monitor by reading parameter files which describe the system configuration, the data format in the logs, and the bases used to calculate response times and availability percentage weights.

The agents permit automatic discovery of processes running within the servers it monitors and cross-reference them to other known processes fully automatically. This provides the detailed data that is necessary to enable a truly effective Event Correlation Engine to be developed, thus minimizing implementation effort in complex environments.

The agents also permit automatic maintenance by automatically recognizing changes to processes within the network (e.g. TP monitors, application programs, databases) and network components, thus minimizing adjustments as the computing environment evolves over time. This feature's value increases exponentially with the complexity of the environment and maintains the integrity of the Event Correlation Engine automatically.

When a problem occurs, the system automatically edits the multitude of alarms that are typically produced, and translates them into meaningful messages that point directly to the cause of the problem, thus expediting appropriate corrective action. The Event Correlation Engine is much simpler to maintain because its Correlation Rules are automatically populated by the Auto Discovery and Auto Maintenance features. It also provides much more accurate diagnostics by looking inside the processes to monitor how well the actual applications are performing.

As noted above, a problem encountered with many existing performance monitors is that they place additional load on a computer system by interrupting the processing of transactions with their own monitoring transactions. This in turn degrades the system whose performance is being monitored.

The invention overcomes these limitations by conducting most of its own processing remotely from the computers processing the business transactions. It accomplishes this through the use of data filtering, which in interactive mode only collects information that indicates system or application failure. The system is capable of sending alerts through connections to System Management Tools such as IBM's Tivoli or HP Openview, and to create trouble tickets through Problem Tracking Systems like Remedy.

Application performance information is extracted from the logs by running the filtering agents in batch mode. The logs are copied to a remote system where the agents can be run non-intrusively.

The administrators of large computing systems are typically located in geographically disparate locations, but typically have access to the Internet or the organization's Intranet facilities. The invention enables all reporting, and many administrative functions, to be conducted at the location of the administrator through convenient, widely available Web Browsers and Internet facilities.

Many large organizations have already invested in other system performance measurement tools. Though not having the full capabilities of the invention, these tools are capable of monitoring and measuring parts of the system. The invention is capable of interconnecting with these tools by capturing the results of their monitoring activity, and storing it in its own central data repositories for later analysis. Thus the user is able to fully capitalize on investments already made in other tools.

The invention includes the capability to store the results of its system monitoring activity within a central repository for later analysis. The nature and amount of data stored may be varied to meet the individual needs of the system administrator. For example, it might include all monitoring transactions or only those transactions encountering problems in the system. The repository can be created using a commercially available Relational Database Management System (RDBMS) in which the user has already invested.

Thus the user has the benefit of not having to invest in new storage software, can use the full capability of a RDBMS, and can integrate the data in this repository with data from other systems to gain additional insight into, and control over the system's overall performance.

The invention's "BDManager," and "BDNetManger" modules enables control over all system monitoring activities to be controlled by a central system administrator. The user therefore has full control from a central location over the points within the system that are being monitored, and over the amount of data that is to be captured and stored.

A system monitoring tool's value is highest when it is monitoring and reporting on system problems. Its value diminishes when it is affected by the problems it is intended to monitor. The invention is designed to minimize the impact of system problems on its own performance and reliability by enabling its management functions to be automatically transferred to other parts of the system when its survival is jeopardized by system problems.

Specifically, the functionality normally performed by BDManager or BDNetManager, immediately upon sensing a problem, can be taken over by a Network Monitor, a "hot stand-by" copy of BDManager, or a Filtering Agent located in a reliable part of the overall System.

Many organizations with large complex computing environments have already made significant investments in "Help Desk" organizations to provide ongoing support to users of their systems, and in Problem Ticket Reporting Systems to support these Help Desk personnel in managing their operations.

The invention, by sharing transactional information with these tools, enables the user to make better use of the tools and further improve their level of service to their users. In particular, the invention, by monitoring the system's capability in processing transactions, can often detect potential problems before they even become perceivable to the end-users. By automatically sending problem alert information to a Problem Ticket Reporting System, Help Desk personnel can take action before the people using the system perceive problems.

The invention provides a comprehensive repository of detailed information related to the System's historical performance under various levels of business volumes, and enables relationships between transaction levels and computing and network capacities to be analyzed and forecasted. This information will be fully available to enable various forms of capacity planning to be conducted in a much more accurate manner.

The central data repository captures as many business transactions as the user requires. In addition to reporting on the system's performance in handling these transactions, the invention can use this historical data to provide information about the distribution of business volumes over periods of time, and trends, to assist in general business planning and management.

The invention is capable of reporting on the actual experience of the user using an application from a workstation. This includes the availability of the application to the user, unexpected loss of use of the application, and quality of response times during the work period. Because the invention is able to diagnose the source of problems, the performance of an individual application can be monitored by filtering out sources of additional problems from the hardware or telecommunications components of the system. This provides valuable information to personnel responsible for designing, building and maintaining business-critical applications for the organization.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

The preferred embodiment will now be set forth in detail with reference to the drawings, in which like reference numerals correspond to like elements throughout.

Figure 1:
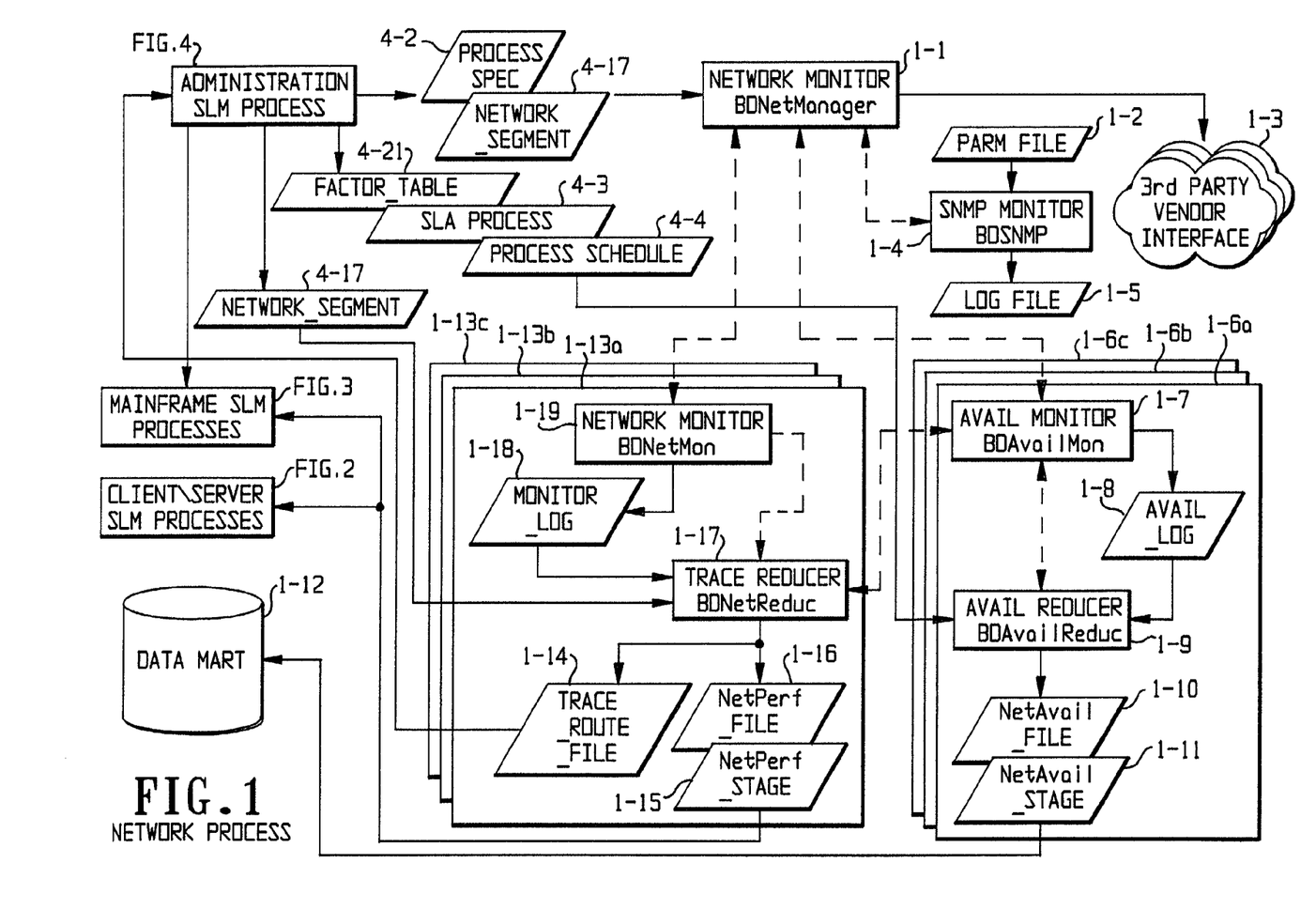
FIG. 1 shows the Network function.

FIG. 1 shows a functional block diagram of the network monitoring processes that make up the Network Monitoring System (NMS) 1. The purpose of this system is to interactively gather both performance and availability information from the enterprise wide network. The focus of the system is performance and availability from the end-users perspective.

Figure 4:
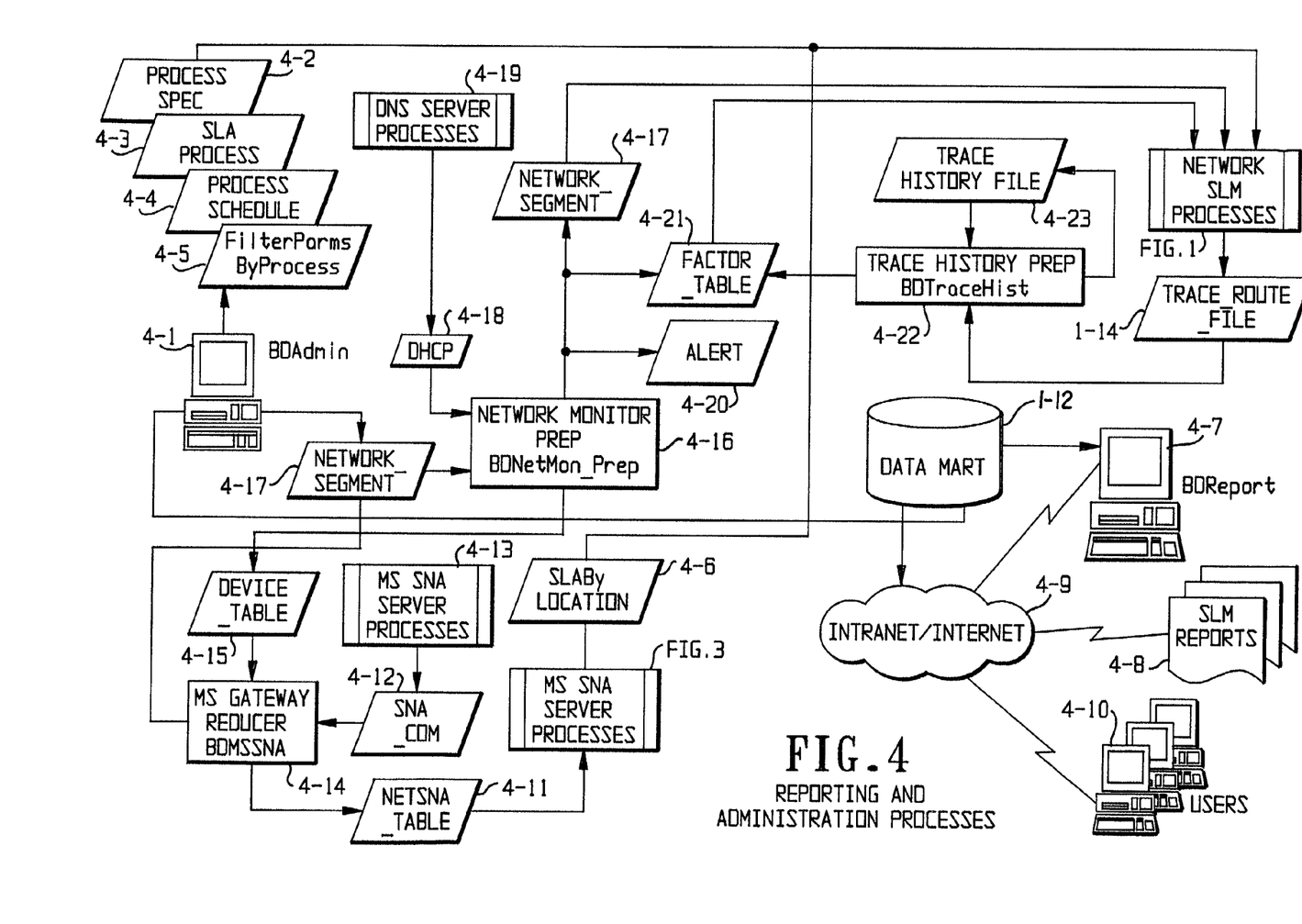
FIG. 4 shows the Reporting & Administration function.

Each process in the NMS has a specialized function. The BDNetManager 1-1 is a single process in the system that controls the monitoring of an entire Enterprise network. One or more sets of performance monitors 1-13a,b,c and Availability Monitors 1-6a,b,c are needed to effectively collect data on a timely basis. The number of monitors needed depends on the distribution and the number of nodes in the network. BDNetManager 1-1 determines the number of monitors needed based on a time threshold. The time threshold is the amount of time it takes to monitor all the segments defined in the Network_Segment table 4-17 maintained by the Administration SLM Processes (FIG. 4).

The Network Monitor Manager process, BDNetManager 1-1, is a centralized manager of all of the Network Monitors that are distributed throughout the network. BDNetManager establishes socket connections with each of the Network monitors, BDNetMon 1-19. BDNetManager 1-1 sends Network Addresses of "End-User" segment ports to BDNetMon(s) 1-19 from which pseudo messages are sent and measured for response times. These messages are routed to start at the "entry" server (TP Monitor) of a production system, which has been defined to be measured. The message's response is tracked from that source to the remote destination. The response for each network segment between major nodes, such as routers and hubs, is collected and written in a Monitor_Log 1-18. For automatic system recovery, the functionality normally performed by the BDNetManager 1-1, immediately upon sensing a problem, can be taken over by BDNetMon 1-19, a "hot stand-by" copy of BDNetManager 1-1, or a Filtering Agent 2-6, 2-19, 2-25 located in a reliable part of the overall System (see FIG. 2 for an example).

BDNetReduc 1-17 reads the Monitor_Log 1-18 and using the Locations file 4-17, interactively formats NetPerf_File 1-16 performance records. These NetPerf_File 1-16 records are staged into NetPerf_Stage 1-15. NetPerf_Stage 1-15 is then used as input into the Client/Server SLM Processes (FIG. 2) and FTP'ed to the Mainframe SLM Processes (FIG. 3) to determine total transaction response times, and response time percentiles. BDNetReduc also determines when messages can't reach a destination indicating a possible network failure. The IP addresses of suspected failed destinations are sent, through a socket connection, to BDAvailMon 1-7.

BDAvailMon 1-7 sends the appropriate messages to the suspected failed network components to determine system availability from the end-users perspective. The messages sent by BDAvailMon 1-7 are collected in an output file, Avail_Log 1-8. BDAvailReduc 1-9 determines if the system network is unavailable for any end-users of the environment, and interactively formats NetAvail_File 1-10 availability records. These NetAvail_File 1-10 records are staged into NetAvail_Stage 1-11 for subsequent loading directly into the Data Mart 1-12. BDAvailReduc 1-9 also reads the Factor_Table 4-21 to determine both the "over-all" and "location specific" affect of a problem on an application.

The SNMP Monitor, BDSNMP 1-4, collects alerts from and polls various network components to determine additions to the network, and to aid BDAvailMon 1-7 in determining potential network component failures. The execution of BDSNMP 1-4 is controlled through Parm File 1-2. If BDSNMP 1-4 detects a component failure, it sends a message to BDNetManager 1-1 through a socket connection that is then forwarded to BDAvailMon 1-7. BDNetManager 1-1 has the capability to link through sockets, files or SNMP to third-party software interfaces 1-3 for sending alerts and formatted data. A Log File 1-5 is created that summarizes all SNMP alerts received and is used for auditing and insuring that all alerts were properly handled.

The Administration SLM Processes (FIG. 4) are the interfaces, and both manual and automated processes that create and maintain parameter files and distribute them to the automated processes. For process BDNetManager 1-1, FIG. 4 provides the ProcessSpec table 4-2, and Network_Segment table 4-17. For process BDAvailReduc 1-9, FIG. 4 provides the Factor_Table 4-21, SLAProcess table 4-3, and ProcessSchedule table 4-4.

Figure 2:
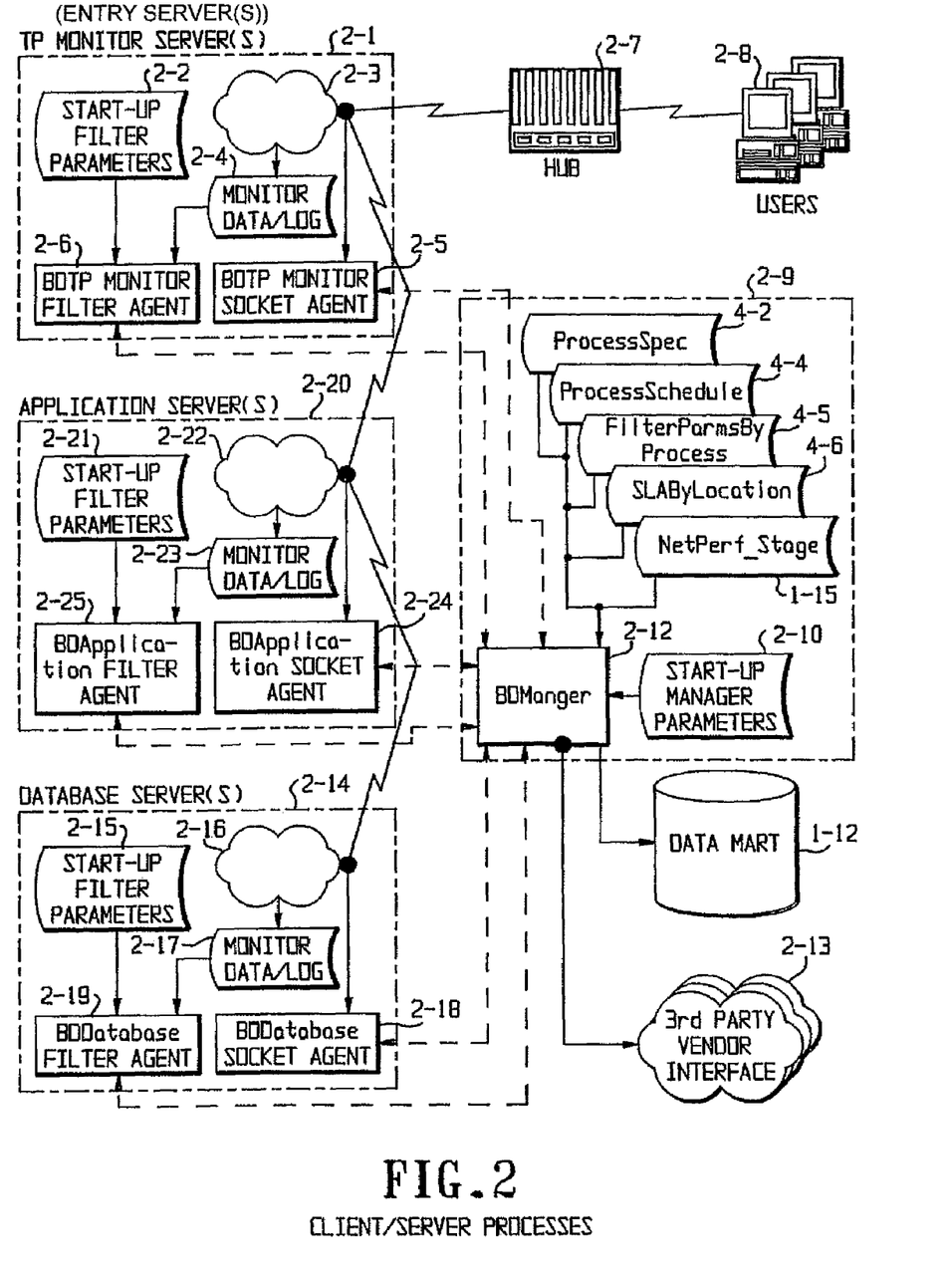
FIG. 2 shows the Client/Server function.

FIG. 2 shows a functional block diagram of the Client/Server monitoring processes that make up the Client/Server Monitoring System (CSMS) 2. The purpose of this system is to interactively gather both performance and availability information from the enterprise Production Client Server Systems. This system collects server performance and availability information that defines the end-user's experience. Herein, "system" refers to the accumulation of all components that make up a complete Client/Server Server-end environment, including the associated TP Monitor servers 2-1, Application servers 2-20, and Database servers 2-14.

BDManager 2-12 is a centralized manager of all of the required monitors that are distributed throughout the system, and typically runs on its own SLM server 2-9. Each server platform within a system has a copy of a Filtering Agent 2-6, 2-19, 2-25. These Filtering Agents 2-6, 2-19, 2-25 collect, accumulate, summarize and forward information about transactions executed by the production applications 2-3, 2-16, 2-22 on each platform. This information is gathered from application logs, or files output by internal application monitors 2-4, 2-17, 2-23. Each Filtering Agent 2-6, 2-19, 2-25 understands the format and accumulation requirements based on information in the Start-up Filter Parameter file 2-2, 2-15, 2-21. This Parameter file has keyword, data field position, data field length and/or field delimiting information so that the Filtering Agent 2-6, 2-19, 2-25 can determine when and how to accumulate and format the data for passing to BDManager 2-12.

If network addresses aren't available from the data the Filtering Agent 2-6, 2-19, 2-25 is accumulating, then the Socket Agent 2-5, 2-18, 2-24 is used to accumulate network addresses of client sessions. Both the Filtering Agents and Socket Agents are connected to BDManager 2-12 through socket connections. This connection is used for passing the appropriate data to BDManager 2-12 and management commands to the agents.

BDManager 2-12 reads a Start-up Manager Parameter file 2-10 that defines the expected data sent by the various Filtering Agents 2-6, 2-19, 2-25 throughout the client/server system. This file also defines the intervals and triggers that define when data is to be sent from the agents to BDManager 2-12.

NetPerf_Stage 1-15 is the daily accumulation of Network Performance data collected by NMS (FIG. 1). BDManager 2-12 merges this data with transaction data collected from the various agents to define the complete end-user performance experience.

The ProcessSchedule table 4-4 defines the times of day that the various systems are scheduled to be up for end-user service. This time is used to determine the effect of component down time or failure on availability of the complete system. The SLAByLocation table 4-6 is used to categorize transactions by Services provided to end-users.

BDManager 2-12 also reads a ProcessSpec table 4-2 that defines the relationship of all of the components that make up a system. This table also defines the affect or factors that define the affect on availability of each component so that the appropriate calculation of the end-user's system availability experience can be accomplished.

BDManager 2-12 accumulates, formats and writes formatted records into the Data Mart 1-12 that defines both the performance and availability experiences for all end-user locations as well as summaries of the overall system. Also, component level details that support the end-user experience and aid in the drill down to problem areas are accumulated, formatted and stored in the Data Mart 1-12 by BDManager 2-12.

BDManager 2-12 has the capability to link through sockets, files or SNMP to third-party software interfaces 2-13 for sending alerts and formatted data. For automatic system recovery, the functionality normally performed by the BDManager 2-12, immediately upon sensing a problem, can be taken over by a "hot stand-by" copy of BDManager 2-12, or a Filtering Agent 2-6, 2-19, 2-25 located in a reliable part of the overall System.

A key feature of the system is its ability to automatically discover and maintain certain environmental information about the Enterprise. The discovery portion of this feature is known as "Auto Discovery," and the maintenance portion of this feature is known as "Auto Maintenance." Both of these features are enabled by installing Filtering Agents 2-6, 2-19, 2-25 on all servers within the Enterprise. When a server is activated, the Filtering Agent 2-6, 2-19, 2-25 is automatically started as a Service Process on NT servers, or as a Daemon on Unix servers. Those skilled in the art who have reviewed the present disclosure will readily appreciate the manner in which the Filtering Agents can be adapted for other operating systems.

When a Filtering Agent 2-6, 2-19, 2-25 first starts, it searches for an available BDManager 2-12. The Filtering Agent 2-6, 2-19, 2-25 creates a Socket Connection with the first BDManager 2-12 it finds. Once connected, the Filtering Agent 2-6, 2-19, 2-25 sends its physical server name and virtual server name to BDManager 2-12. The Filtering Agent 2-6, 2-19, 2-25 then checks for the existence of a Start-up Filter Parameter file 2-2, 2-15, 2-21 on its local server. If a Start-up Filter Parameter file 2-2, 2-15, 2-21 exists, the Filtering Agent 2-6, 2-19, 2-25 begins monitoring based on the parameters in that file. If a Start-up Filter Parameter file 2-2, 2-15, 2-21 does not exist, the Filtering Agent 2-6, 2-19, 2-25 sends a "No Parms" message back to BDManager 2-12. BDManager 2-12 will then ask the server's Filtering Agent 2-6, 2-19, 2-25 for its currently active processes and associated connections, i.e., Socket Connections, ODBC Connections, etc. BDManager 2-12 uses this information to automatically update environmental information about the Enterprise.

BDManager 2-12 then checks the FilterParnsByProcess table 4-5 to get the name of the Start-up Filter Parameter file 2-2, 2-15, 2-21. Filtering Agents 2-6, 2-19, 2-25 can either read the Start-up Filter Parameter file 2-2, 2-15, 2-21 from its current location or copy the file to the server it is running on. The action the Filtering Agent 2-6, 2-19, 2-25 takes, copy or read, is sent by BDManager 2-12 as a command through its Socket Connection with the Filtering Agent 2-6, 2-19, 2-25. Once the Start-up Filter Parameter file 2-2, 2-15, 2-21 is in place, the Filtering Agent 2-6, 2-19, 2-25 begins monitoring based on the parameters in that file.

Currency of this environmental information is automatically maintained through a refresh mechanism within the Filtering Agent 2-6, 2-19, 2-25. This refresh mechanism is triggered through a system interrupt that the Filtering Agent 2-6, 2-19, 2-25 is monitoring. When this interrupt is received, the Filtering Agent 2-6, 2-19, 2-25 will send any new processes and associated connections to BDManager 2-12. BDManager 2-12 then checks the FilterParmsByProcess table 4-5 to see if it should be a monitored process; if not, it is dropped and the process will be ignored. If it is a monitored process, BDManager 2-12 sends the file name of the new Start-up Filter Parameter file 2-2, 2-15, 2-21 to the Filtering Agent 2-6, 2-19, 2-25. The Filtering Agent 2-6, 2-19, 2-25 then updates its filtering parameters based on information in this new Start-up Filter Parameter file 2-2, 2-15, 2-21.

The above operations allow an Event Correlation Engine to be created and maintained in BDManager 2-12. The Event Correlation Engine provides an updated picture of the computing environment of the enterprise. Thus, when an alarm is reported, the Event Correlation Engine permits the generation of an error message that identifies the nature and source of the error, thus permitting the error to be rectified easily.

Figure 3:
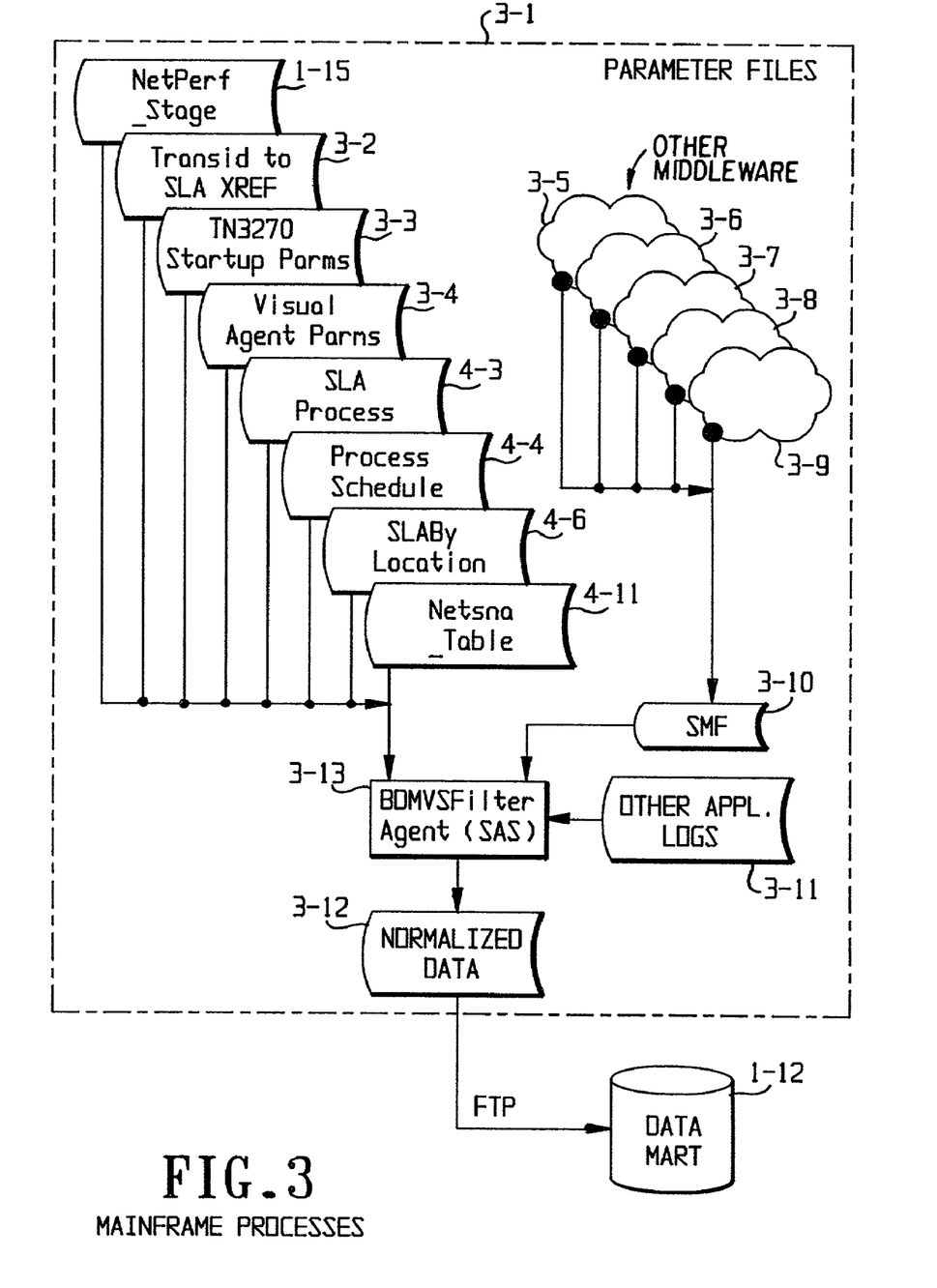
FIG. 3 shows the Mainframe function.

FIG. 3 shows a functional block diagram of the Mainframe monitoring processes that make up the Mainframe Monitoring System (MMS) 3. The purpose of this system is to gather both performance and availability information from the production logical partitions (LPARS) running on a Mainframe 3-1. The primary agent for this system is BDMVSFilter 3-13.

BDMVSFilter 3-13 reads SMF 3-10 record types 30 and 110 and other record types that define application logs to gather the end-user's experience at the transaction level for CICS (customer information control systems), and all associated address-spaces 3-5, 3-6, 3-7, 3-8, 3-9. Also, other application logs 3-11 can be defined to provide appropriate data in the case where the application doesn't have an interface to SMF. BDMVSFilter 3-13 has several Parameter files that define various connections, groupings and schedules.

The Netsna_Table 4-11 is gathered by the Administrative Processes (FIG. 4) from the various network gateways in the Enterprise Network. This file defines the cross-reference of LUNAMES (network addresses understood by the MVS environment), to IP addresses (network addresses understood by the open network environment). This cross-reference enables MMS to categorize transactions by the location of the end-user. If TN3270 (CISCO CIP products, etc) is used, the TN3270 Startup Parms 3-3 is used to further define the LUNAME to IP address relationship.

The TRANSID to SLA XREF 3-2 cross-references a System ID (SID) used by the Customer's Chargeback system to locate Transaction ID's (TRANSID). The SLAByLocation table 4-6 contains the SLAs that are based on location. Together these two files are used to categorize transactions by Services provided to end-users. Both the TRANSID to SLA XREF 3-2 and SLAByLocation tables 4-6 are manually updated by the administrator.

The SLAProcess table 4-3 is used to cross-reference Mainframe server Job Names and LPARs with SLA(s) for the purpose of calculating Availability.

The NetPerf_Stage file 1-15 is the daily accumulation of Network Performance data collected by NMS (FIG. 1). This data is merged with transaction data from SMF 3-10 by the BDMVSFilter 3-13 to define the complete end-user performance experience.

The ProcessSchedule table 4-4 defines the times of day that the various systems are scheduled to be up for end-user service. This time is used to determine the affect of component down time or failure on availability of the complete system.

The Visual Agent Parms 3-4 defines the "think time" and transaction patterns that define the characteristics of software that can use multiple CICS transactions to emulate a single end-user transaction.

The data summarized by BDMVSFilter 3-13 is temporarily stored in a Normalized Data format 3-12 and subsequently FTP'ed for loading into the Data Mart 1-12.

FIG. 4 shows a functional block diagram of the Administrative processes and components that make up the BD Administrative System (BAS) 4. The purpose of this system is to gather the appropriate data to support all of the other system components of the InsightETE System. This environment is made up of batch processes and administrative 4-1 and reporting 4-7 interfaces that allow for the maintenance of the various tables and parameter files that control the operation and reporting 4-8 of the system.

The Network Monitor Prep process, BDNetMon_Prep 4-16 reads the DHCP database 4-18 from the DNS Server 4-19, and Network_Segment table 4-17 to build the Network profile as defined by the Device_Table 4-15, the Network_Segment table 4-17, and the Factor_Table 4-21. The Device_Table 4-15 includes every device in the Network with a description and category for each device. BDNetMon_Prep 4-16 also creates entries in the Alert table 4-20 defining new segments added to the network, which will need a LOCID determined by the Administrator. The Network Segment table 4-17 also defines the Router and Hub ports that define the Network connections of every segment within the network. The Factor_Table 4-21 contains the Factors used by network availability calculations; typically defined as the number of workstations in a segment divided by the total number of workstations in a location or in the entire enterprise.

The MSGateway Reducer, BDMSSNA 4-14 reads the SNA_Com "startup parameters" 4-12 of the Microsoft SNA Gateway 4-13. Contained in these parameters are the LUNAMES, the Workstation Domain Names, and the cross-references to the Device_Table 4-15. The Device_Table 4-15 contains IP addresses and the Workstation Domain Names. The Network_Segment table 4-17 contains IP segment addresses and Locations that are used to produce a LUNAME to IP Address to Location cross-reference, and a Netsna_Table 4-11 cross-reference. This file is used by the Mainframe SLM Processes (FIG. 3).

The Trace History Prep Process, BDTraceHist 4-22, reads the Trace_Route_File 1-14 and produces an accumulated average in the Trace History File 4-23, and updates information in the Factor_Table 4-21 for use by Capacity Planning tools, and ad hoc analysis.

The Network_Segment table 4-17 is updated by BDNetMon_Prep 4-16 with undefined locations. These new locations are sent to an Alert table 4-20 and subsequently added back to the Network_Segment table 4-17 by the administrator.

The ProcessSpec table 4-2 contains the base servers' descriptions and network addresses used by BDNetManager 1-1 for network monitoring. The ProcessSpec table 4-2 is manually maintained by the administrator.

The SLAProcess table 4-3 contains the descriptions of the SLA Groups and cross-reference of SLAs to processes. The SLAProcess table 4-3 is manually maintained by the administrator.

The ProcessSchedule table 4-4 contains the scheduled uptime of all systems that are monitored. It is used by BDMVSFilter 3-13, BDAvailReduc 1-9, and BDManager 2-12 to determine affects of availability incidents. The ProcessSchedule table 4-4 is manually maintained by the administrator.

The FilterParmsByProcess table 4-5 contains the name of the Start-up Filter Parameter file 2-2, 2-15, 2-21 associated with any given servers Filtering Agent 2-6, 2-19, 2-25. The FilterParmsByProcess table 4-5 is manually maintained by the administrator.

The SLAByLocation table 4-6 contains the SLAs that are based on location. It is used by BDMVSFilter 3-13 and by BDManager 2-12. The SLAByLocation table 4-6 is manually updated by the administrator using a cross-reference to Locations file 4-17.

Figure 5:
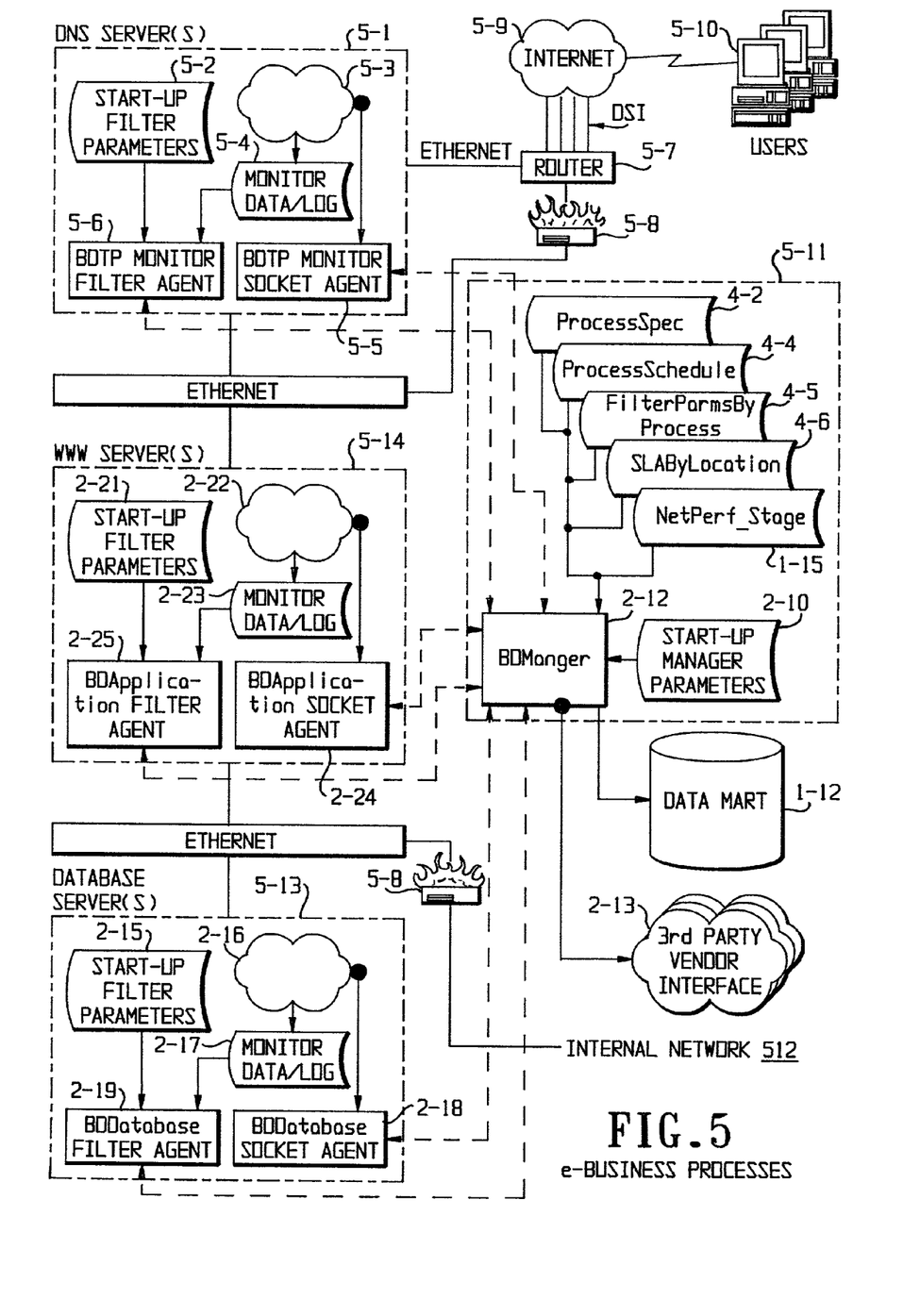
FIG. 5 shows the e-Business function.

FIG. 5 shows a functional block diagram of the e-Business monitoring processes that make up the e-Business Monitoring System (EMS) 5. The purpose of this system is to interactively gather both performance and availability information from the enterprise Internet and Intranet systems. This system collects both server and network performance, and availability information that defines the end-user's experience. Hereon, "system" refers to the accumulation of all components that make up a complete Internet or Intranet environment, including the associated DNS servers 5-1, Web Application servers 5-14, and Database servers 5-13.

BDManager 2-12 is a centralized manager of all of the required monitors that are distributed throughout the e-Business system, and typically runs on its own SLM server 5-11. Each server platform within a system has a copy of a Filtering Agent 2-19, 2-25, 5-6. These Filtering Agents 2-19, 2-25, 5-6 collect, accumulate, summarize and forward information about transactions executed by the production applications 2-16, 2-22, 5-3 on each platform. This information is gathered from application logs, or files output by internal application monitors 2-17, 2-23, 5-4. Each Filtering Agent 2-19, 2-25, 5-6 understands the format and accumulation requirements based on information in the Start-up Filter Parameter file 2-21, 2-15, 5-2. This Parameter file has keyword, data field position, data field length and/or field delimiting information so that the Filtering Agent 2-19, 2-25, 5-6 can determine when and how to accumulate and format the data for passing to BDManager 2-12.

If network addresses aren't available from the data the Filtering Agent 2-19, 2-25, 5-6 is accumulating, then the Socket Agent 2-18, 2-24, 5-5 is used to accumulate network addresses of client sessions. Both the Filtering Agents and Socket Agents are connected to BDManager 2-12 through socket connections. This connection is used for passing the appropriate data to BDManager 2-12 and management commands to the agents.

BDManager 2-12 reads a Start-up Manager Parameter file 2-10 that defines the expected data sent by the various Filtering Agents 2-19, 2-25, 5-6 throughout the Internet or Intranet system. This file also defines the intervals and triggers that define when data is to be sent from the agents to BDManager 2-12.

NetPerf_Stage 1-15 is the daily accumulation of Network Performance data collected by NMS (FIG. 1). BDManager 2-12 merges this data with transaction data collected from the various agents to define the complete end-user performance experience.

The ProcessSchedule table 4-4 defines the times of day that the various systems are scheduled to be up for end-user service. This time is used to determine the affect of component down time or failure on availability of the complete system. The SLAByLocation table 4-6 is used to categorize transactions by Services provided to end-users.

BDManager 2-12 also reads a ProcessSpec table 4-2 that defines the relationship of all of the components that make up a system. This table also defines the affect or factors that define the affect on availability of each component so that the appropriate calculation of the end-user's system availability experience can be accomplished.

BDManager 2-12 accumulates, formats and writes formatted records into the Data Mart 1-12 that defines both the performance and availability experiences for all end-user locations as well as summaries of the overall system. Also, component level details that support the end-user experience and aid in the drill down to problem areas are accumulated, formatted and stored in the Data Mart 1-12 by BDManager 2-12.

BDManager 2-12 has the capability to link through sockets, files or SNMP to $3^{rd}$ party software interfaces 2-13 for sending alerts and formatted data. For automatic system recovery, the functionality normally performed by the BDManager 2-12, immediately upon sensing a problem, can be taken over by a "hot stand-by" copy of BDManager 2-12, or a Filtering Agent 2-19, 2-25, 5-6 located in a reliable part of the overall System.

BDManager 2-12 has other capabilities and functions that have already been described above. Therefore, such description will not be repeated here.

The Network experience is collected by placing a performance Java Applet (PJA) on each page of the Web System. This applet along with an associated Serverlet sets timestamps at the access and receipt of the page by the client and again when it sends a socket message back to the Java Serverlet. The three stamps and associated client IP addresses are accumulated by the applet and Serverlet and stored with tokens that provide a cross-reference for calculation of the end-user performance and availability of each accessed page. This information is cross-referenced with the timestamps and IP addresses stored with the server data to provide the end-user experience.

Figure 6:
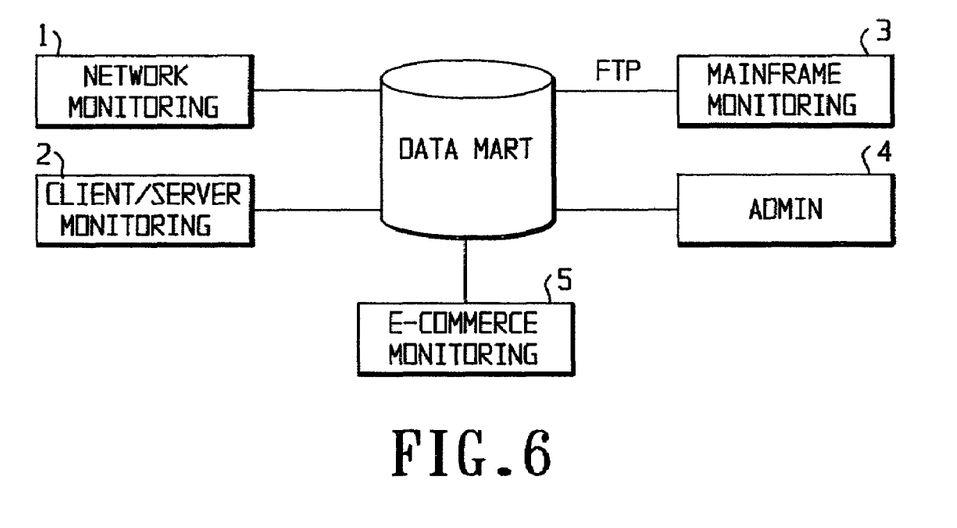
FIG. 6 shows the interconnection of all five functions through the central data repository.

FIG. 6 shows an overview of the way in which the data mart 1-12 ties together the network monitoring system 1, the client/server monitoring system 2, the mainframe monitoring system 3, the administrative system 4, and the e-business monitoring system 5.

While a preferred embodiment of the present invention has been set forth above, those skilled in the art who have reviewed the present disclosure will readily appreciate that other embodiments can be realized within the scope of the present invention. For example, references to specific hardware, software, networking protocols, and the like will be understood to be illustrative rather than limiting. Therefore, the present invention should be understood as limited only by the appended claims.

We claim:

1. A method for monitoring performance and availability of application servers on a network, including a percentage of time that each of the application servers is available to an end user relative to the time the application servers are intended to be available and a responsiveness of the application servers to the end user in terms of a delay between the end user's entering data into a workstation keyboard and a response from one of the application servers with new data on the user's workstation screen, the method comprising:

(a) running at least one performance monitor process on the network, said at least one performance monitor process watching network activity to and from the application servers to entry servers which connect the network to the end user's workstation and creating a transaction response time log and activity audit trail for the network;

(b) running a network monitor manager process on the network, for consolidating information from the transaction response time log;

(c) establishing a connection from the network monitor manager process to said at least one performance monitor process to control said at least one performance monitor to send a pseudo message for tracking time in the network to an entry server to determine said network availability; and (d) receiving the pseudo message from said at least one performance monitor process and determining a response for the pseudo message for each segment of the network traversed by the pseudo message to determine where problems regarding said availability exist within the network connection for the entry server:

(i) running a client-server monitoring process on a server dedicated to the client-server monitoring process;

(j) receiving, in the client-server monitoring process, information about transactions executed by production applications on the network; and (k) determining performance and availability of the production applications in accordance with the information received in step (j); wherein step (j) comprises running a filtering agent on each or on behalf of each of the production applications to convert the information from application logs into a form usable by the client-server monitoring process; wherein the network comprises a mainframe having at least one logical partition which generates an application log; and the method further comprises step (l) monitoring the application log through a mainframe monitoring process.

2. The method of claim 1, further comprising:

(e) running at least one availability monitor process on the network;

(f) from the response determined in step (d), detecting at least one possibly failed component of the network;

(g) sending a message from the at least one availability monitor process to the at least one possibly failed component; and (h) determining, in accordance with a result of the message, whether the at least one possibly failed component has failed.

3. The method of claim 1, wherein:

the application log comprises transaction entries having end-user addresses; and step (l) comprises categorizing the transaction entries by the end-user addresses.

4. The method of claim 1, wherein each said filtering agent detects processes running on the network and cross-references the detected processes to known processes, and further comprising forming an event correlation engine in accordance with the detected processes.

5. The method of claim 3, further comprising (m) generating a performance report for the network through an administrative process and making the report available over a data network.

6. The method of claim 4, wherein each said filtering agent detects changes to the processes running on the network, and further comprising maintaining the event correlation engine in accordance with the detected changes to the processes.

7. The method of claim 5, wherein the data network comprises the Internet.

8. The method of claim 6, further comprising, when it is determined in step (k) that the performance or the availability of one of the production applications is impaired, determining and reporting a cause of impairment and its corresponding effect on a service level agreement (SLA) in accordance with the event correlation engine.

9. The method of claim 7, further comprising:

(n) receiving, in the client-server monitoring process, information about transactions executed by e-commerce applications on the network; and (o) determining performance and availability of the e-commerce applications in accordance with the information received in step (n) through an e-commerce monitoring process.

10. The method of claim 9, wherein at least one of the e-commerce applications makes at least one Web page accessible to customers, and wherein step (n) comprises placing code in the at least one Web page, the code sending time stamps to the client-server monitoring process when the code is accessed.

11. The method of claim 10, further comprising providing a central data repository, and wherein the network monitor manager process, the client-server monitoring process, the mainframe monitoring process, the administrative process, and the e-commerce monitoring process communicate with one another through the central data repository.

* * * * *